UNITED STATES PATENT OFFICE.

GEORGE DEFREN, OF BROOKLINE, MASSACHUSETTS.

PREPARATION OF BEVERAGES.

960,841.  Specification of Letters Patent.  Patented June 7, 1910.

No Drawing.  Application filed June 13, 1906.  Serial No. 428,377.

*To all whom it may concern:*

Be it known that I, GEORGE DEFREN, a citizen of the United States, residing at Brookline, in the county of Norfolk, State of Massachusetts, have invented certain new and useful Improvements in the Preparation of Beverages; and I do hereby declare the following to be a full, clear, and exact description of the invention, such as will enable others skilled in the art to which it appertains to make and use the same.

The present invention relates to improvements in the preparation of beverages, particularly malt beverages, as well as non-intoxicating beverages, or "soft drinks", so called, which shall be more palatable, possessed of greater nutritive properties, and of different composition, than the beverages prepared in accordance with the processes in use at the present time.

To this end, the invention resides, generally, in the addition of milk-sugar, or caramelized milk-sugar, and more especially the substitution of such element, for a certain percentage of the barley malt, or other malted or unmalted cereal or cereals, or any other sugar or sugars, hitherto employed in brewing processes, or in the production of any other beverage.

In the preparation of beer, ale, porter, or other malt beverages, as is generally understood, a portion of the malt utilized to produce the wort, is ordinarily replaced by cane sugar, glucose, grape-sugar, or syrups, or by cereal grits, flaked cereal, rice, or wheat, or other malted or unmalted cereal or cereals, these being added to cheapen the cost of production, reduce the color of the beverage, or change its characteristics, some of the carbohydrates in the wort being fermented by the yeast, while another portion is unaffected thereby, the latter portion being generally termed the extract. The aromatic flavor of the wort is derived from the malt which has been dried or "caramelized" by heat. The milk-sugar, or caramelized milk sugar, which I employ in following out my process, is added directly to the wort, in amounts varying from one per cent. to twenty per cent., as conditions warrant. This element is not, however, decomposed by the common beer yeast, or common ferment used owing to which fact, it will be apparent that if any other fermentable sugars be present in the beverage, the amount of extractive matter remaining unfermented (including the entire amount of milk-sugar added) would be largely increased, thus rendering the liquid more palatable. For example, a malt wort of approximately 12 per cent. extract was made in the usual well known manner and divided into three equal portions. The first portion was fermented in the usual manner. To the second portion was added twelve pounds of milk sugar per eighty-eight pounds of water, or 12 per cent., thus making the total gravity about 24 per cent. This portion was then also fermented. The third portion was prepared as was the second but modified by adding one liter of water to one liter of wort, in other words, diluted one-half; this was also fermented, and the resulting beers analyzed for alcohol and "extract" with the following results:

|  | # 1. | # 2. | # 3. |
|---|---|---|---|
| Original gravity, about | 12% | 24% | 12% |
| Alcohol, finished beer | 3.6% | 3.5% | 1.9% |
| Extract in finished beer | 4.9% | 17% | 8.3% |

It will be noted that in the finished beers, the first and the second contains practically the same amount of alcohol, while the third contains about one-half as much alcohol as do the first and second. It will be noted also that the second, with the same amount of alcohol as the first contains much more extract than does the first. This is due to the milk sugar added, none of which has been decomposed during the process of fermentation. It is likewise evident from an inspection of the third portion of the fermented wort, where, with the same initial gravity as the first portion, the finished beer gave about half as much alcohol and a much larger extract, this result likewise being due to the unchanged milk sugar. A comparison of the three portions indicates therefore that the ratio of the percentages of alcohol to extract can be very easily controlled by the addition of milk sugar. In like manner, the same result is obtained where milk-sugar is added to the juice expressed from grapes, apples, pears, or other fruit or fruits, or to the sugar base, or as a substitute for the sugar base, of that class of beverages known as "non-intoxicating" beverages, or "soft drinks", the total amount of extractive, or unfermented matter being increased in each instance, or its composition altered or changed. It will also be understood that my invention contemplates the utilization whenever desired of milk-sugar which has been caramelized by heat. Furthermore, the ratio of the amount of fermentable sugars to the amount of extract in a beverage can be so regulated by the addition of milk sugar that any desired percentage of alcohol, or of extract, can be obtained.

What is claimed is:

1. As a step in the process of producing beverages, the addition of milk sugar to a fermentable sugar to increase the amount of extractive matter.

2. As a step in the process of producing beverages, the addition of milk sugar, to a ferment inactive with respect to milk sugar, and a fermentable sugar, to increase the amount of extractive matter.

3. As a step in a process of producing malt beverages, the addition of milk sugar, to a yeast which does not ferment same, and a fermentable sugar, to increase the amount of extractive matter.

4. As a step in a process for the production of malt beverages, the addition of milk sugar to the wort, to increase the amount of extractive matter.

5. As a step in a process of producing beverages, the addition of caramelized milk sugar inactive with respect to milk sugar to a fermentable sugar to increase the amount of extractive matter.

In testimony whereof, I affix my signature, in presence of two witnesses.

GEORGE DEFREN.

Witnesses:
EDWARD W. BAKER,
URSA DUNBAR.

---

Corrections in Letters Patent No. 960,841.

It is hereby certified that in Letters Patent No. 960,841, granted June 7, 1910, upon the application of George Defren, of Brookline, Massachusetts, for an improvement in "Preparation of Beverages" an error appears in the printed specification requiring correction as follows: Page 2, line 30, strike out the words "inactive with respect to milk sugar," and line 31, after the word "sugar," insert the words *inactive with respect to milk sugar;* and that the proper corrections have been made in the files and records of the Patent Office and are hereby made in the said Letters Patent.

Signed and sealed this 11th day of October, A. D., 1910.

[SEAL.]

E. B. MOORE,
*Commissioner of Patents.* invention contemplates the utilization whenever desired of milk-sugar which has been caramelized by heat. Furthermore, the ratio of the amount of fermentable sugars to the amount of extract in a beverage can be so regulated by the addition of milk sugar that any desired percentage of alcohol, or of extract, can be obtained.

What is claimed is:

1. As a step in the process of producing beverages, the addition of milk sugar to a fermentable sugar to increase the amount of extractive matter.

2. As a step in the process of producing beverages, the addition of milk sugar, to a ferment inactive with respect to milk sugar, and a fermentable sugar, to increase the amount of extractive matter.

3. As a step in a process of producing malt beverages, the addition of milk sugar, to a yeast which does not ferment same, and a fermentable sugar, to increase the amount of extractive matter.

4. As a step in a process for the production of malt beverages, the addition of milk sugar to the wort, to increase the amount of extractive matter.

5. As a step in a process of producing beverages, the addition of caramelized milk sugar inactive with respect to milk sugar to a fermentable sugar to increase the amount of extractive matter.

In testimony whereof, I affix my signature, in presence of two witnesses.

GEORGE DEFREN.

Witnesses:
EDWARD W. BAKER,
URSA DUNBAR.

---

Corrections in Letters Patent No. 960,841.

It is hereby certified that in Letters Patent No. 960,841, granted June 7, 1910, upon the application of George Defren, of Brookline, Massachusetts, for an improvement in "Preparation of Beverages" an error appears in the printed specification requiring correction as follows: Page 2, line 30, strike out the words "inactive with respect to milk sugar," and line 31, after the word "sugar," insert the words *inactive with respect to milk sugar;* and that the proper corrections have been made in the files and records of the Patent Office and are hereby made in the said Letters Patent.

Signed and sealed this 11th day of October, A. D., 1910.

[SEAL.]

E. B. MOORE,
*Commissioner of Patents.*

It is hereby certified that in Letters Patent No. 960,841, granted June 7, 1910, upon the application of George Defren, of Brookline, Massachusetts, for an improvement in "Preparation of Beverages" an error appears in the printed specification requiring correction as follows: Page 2, line 30, strike out the words "inactive with respect to milk sugar," and line 31, after the word "sugar," insert the words *inactive with respect to milk sugar;* and that the proper corrections have been made in the files and records of the Patent Office and are hereby made in the said Letters Patent.

Signed and sealed this 11th day of October, A. D., 1910.

[SEAL.]

E. B. MOORE,
*Commissioner of Patents.*